United States Patent
Harada

(10) Patent No.: US 7,609,396 B2
(45) Date of Patent: Oct. 27, 2009

(54) IMAGE PROCESSING APPARATUS FOR DETERMINING WHETHER A SCANNED IMAGE INCLUDES A LATENT PATTERN AND A BACKGROUND PATTERN, AND AN IMAGE PROCESSING METHOD THEREFOR

(75) Inventor: Koji Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 11/456,977

(22) Filed: Jul. 12, 2006

(65) Prior Publication Data
US 2007/0025787 A1  Feb. 1, 2007

(30) Foreign Application Priority Data
Jul. 29, 2005  (JP)  ............... 2005-221460
Jun. 30, 2006  (JP)  ............... 2006-182187

(51) Int. Cl.
G06K 15/00  (2006.01)
G03G 21/00  (2006.01)

(52) U.S. Cl. .................... 358/1.1; 358/3.28

(58) Field of Classification Search .......... 358/1.1, 358/1.9, 3.28, 1.14, 1.15, 402; 399/80, 81; 382/100
See application file for complete search history.

(56) References Cited

U.S. PATENT DOCUMENTS

| | | | | |
|---|---|---|---|---|
| 5,410,642 A | * | 4/1995 | Hakamatsuka et al. | 358/1.14 |
| 6,606,167 B1 | * | 8/2003 | Rees et al. | 358/1.9 |
| 6,822,754 B1 | * | 11/2004 | Shiohara | 358/1.15 |
| 7,307,761 B2 | * | 12/2007 | Man | 358/3.28 |
| 2003/0179399 A1 | * | 9/2003 | Matsunoshita | 358/1.13 |
| 2004/0001610 A1 | | 1/2004 | Murakami | 382/100 |
| 2004/0150859 A1 | | 8/2004 | Hayashi | 382/100 |
| 2005/0078974 A1 | | 4/2005 | Uchida et al. | 399/81 |
| 2006/0280515 A1 | | 12/2006 | Harada | 399/80 |

FOREIGN PATENT DOCUMENTS

| JP | 10-2333930 | 9/1998 |
|---|---|---|
| JP | 2001-197297 | 7/2001 |
| JP | 2004-40234 | 2/2004 |
| JP | 2004-223854 | 8/2004 |

OTHER PUBLICATIONS

Office Action for corresponding Chinese Application No. 2006100995496 dated Feb. 1, 2008.

* cited by examiner

*Primary Examiner*—Gabriel I Garcia
(74) *Attorney, Agent, or Firm*—Fitzpatrick, Cella, Harper & Scinto

(57) ABSTRACT

There is provided a technique of reflecting the state of the copy-forgery-inhibited pattern (CFIP) of a paper document on various operations when the paper document with the CFIP is converted into an electronic document. For this purpose, an image processing apparatus includes a first determination unit which determines whether a latent pattern exists in an input image, a second determination unit which determines whether a background pattern exists in the input image, and a control unit which, in the case that it is determined that the latent pattern exists and that the background pattern exists, controls to copy the input image, and in the case that it is determined that the latent pattern exists and that no background pattern exists, controls to inhibit copying of the input image.

5 Claims, 13 Drawing Sheets

FIG. 2
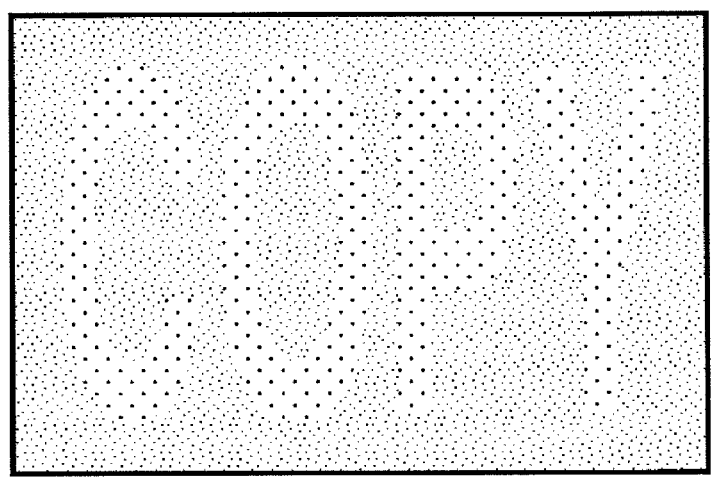
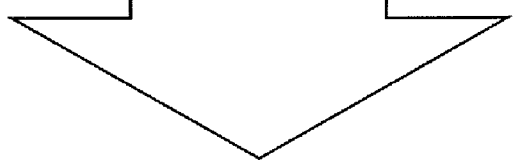
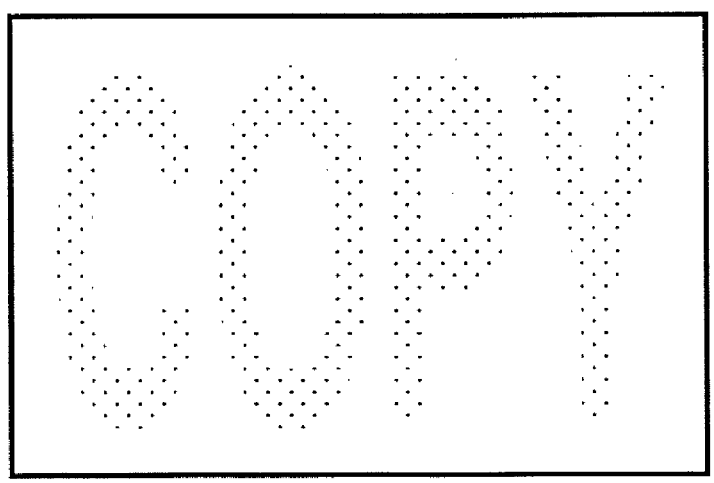

IMAGE PROCESSING APPARATUS FOR DETERMINING WHETHER A SCANNED IMAGE INCLUDES A LATENT PATTERN AND A BACKGROUND PATTERN, AND AN IMAGE PROCESSING METHOD THEREFOR

BACKGROUND OF THE INVENTION

1. Field of the Invention

The present invention relates to an image processing technique and, more particularly, to a technique of processing image data having a latent image component such as a copy-forgery-inhibited pattern.

2. Description of the Related Art

Paper documents such as receipts, bonds, and certificates are sometimes printed with special patterns in the background that appear as text or images upon copying so as to inhibit easy copying of these documents. This special pattern is generally called a copy-forgery-inhibited pattern (to be simply referred to as a CFIP hereinafter), and contains two areas: an area (latent area) where a dot pattern remains after copying and an area (background area) where a dot pattern disappears after copying. A mechanism such as a CFIP which inhibits easy copying of an original document has an effect of mentally suppressing copying of an original document. Public agencies and companies purchase security paper on which a CFIP containing a text (e.g., "copy") and an image (latent image) is printed in advance, and print on the security paper a document whose originality is to be assured.

Especially, Japanese Patent Laid-Open No. 2001-197297 discloses a technique (to be referred to as an on-demand copy-forgery-inhibited pattern output method hereinafter) of creating a copy-forgery-inhibited pattern by software, and outputting from a laser printer a document on which the CFIP is laid out on the background. According to the on-demand copy-forgery-inhibited pattern output method using a printer, a document on which a CFIP is laid out on the background can be printed using plain paper. A document on which a CFIP is laid out on the background can, therefore, be printed by a necessary number of copies, as needed. Unlike a conventional method, no security paper need be prepared more than necessary. The on-demand copy-forgery-inhibited pattern output method using a printer can reduce paper costs much more than a conventional document copy forgery inhibition method using security paper.

In Japan, a law to legally accept save of not only paper documents but also electronic documents is enforced. In short, this law permits private companies and the like which are obliged to save documents (e.g., business reports and receipts), to save them as electronic data. Even existing paper documents with CFIPs are saved as electronic documents of digital data. A technique for seamlessly using paper documents and electronic documents becomes very important.

However, the patent reference described above discloses only a copy-forgery-inhibited pattern detection method. That is, this reference does not disclose any technique of taking over a function corresponding to the CFIP of a paper document when the paper document is converted into an electronic document.

SUMMARY OF THE INVENTION

The present invention has been made to overcome the conventional drawbacks, and has as its object to provide a technique of reflecting the state of the copy-forgery-inhibited pattern of a paper document on various operations when the paper document with the CFIP is converted into an electronic document.

To achieve the above object, an image processing apparatus according to the present invention comprises a first determination unit which determines whether a latent pattern exists in an input image, a second determination unit which determines whether a background pattern exists in the input image, and a control unit which, in the case that the first determination unit determines that the latent pattern exists in the input image and the second determination unit determines that the background pattern exists in the input image, controls to copy the input image, and in the case that the first determination unit determines that the latent pattern exists in the input image and the second determination unit determines that no background pattern exists in the input image, controls to inhibit copying of the input image.

An image processing apparatus control method according to the present invention comprises a first determination step of determining whether a latent pattern exists in an input image, a second determination step of determining whether a background pattern exists in the input image, and a control step of, in the case that the latent pattern is determined in the first determination step to exist in the input image and the background pattern is determined in the second determination step to exist in the input image, controlling to copy the input image, and in the case that the latent pattern is determined in the first determination step to exist in the input image and the background pattern is determined in the second determination step not to exist in the input image, controlling to inhibit copying of the input image.

The present invention can provide a technique of reflecting the state of the copy-forgery-inhibited pattern of a paper document on various operations when the paper document with the CFIP is converted into an electronic document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view illustrating the appearances of a document with a CFIP before and after copying;

DESCRIPTION OF THE EMBODIMENTS

Preferred embodiments of the present invention will be illustratively described in detail below with reference to the accompanying drawings. However, building components described in the following embodiments are merely an example, and are not construed to limit the scope of the present invention to only them.

First Embodiment

<General Description>

In the first embodiment, a paper document is scanned, and the type of paper document is determined in accordance with the presence/absence of latent and background areas. Further, the first embodiment will describe a method of removing portions corresponding to the latent and background areas from document image data, and generating an electronic document corresponding to the type of paper document using a visible watermark technique.

<Assumed Technique>

Figure 12:
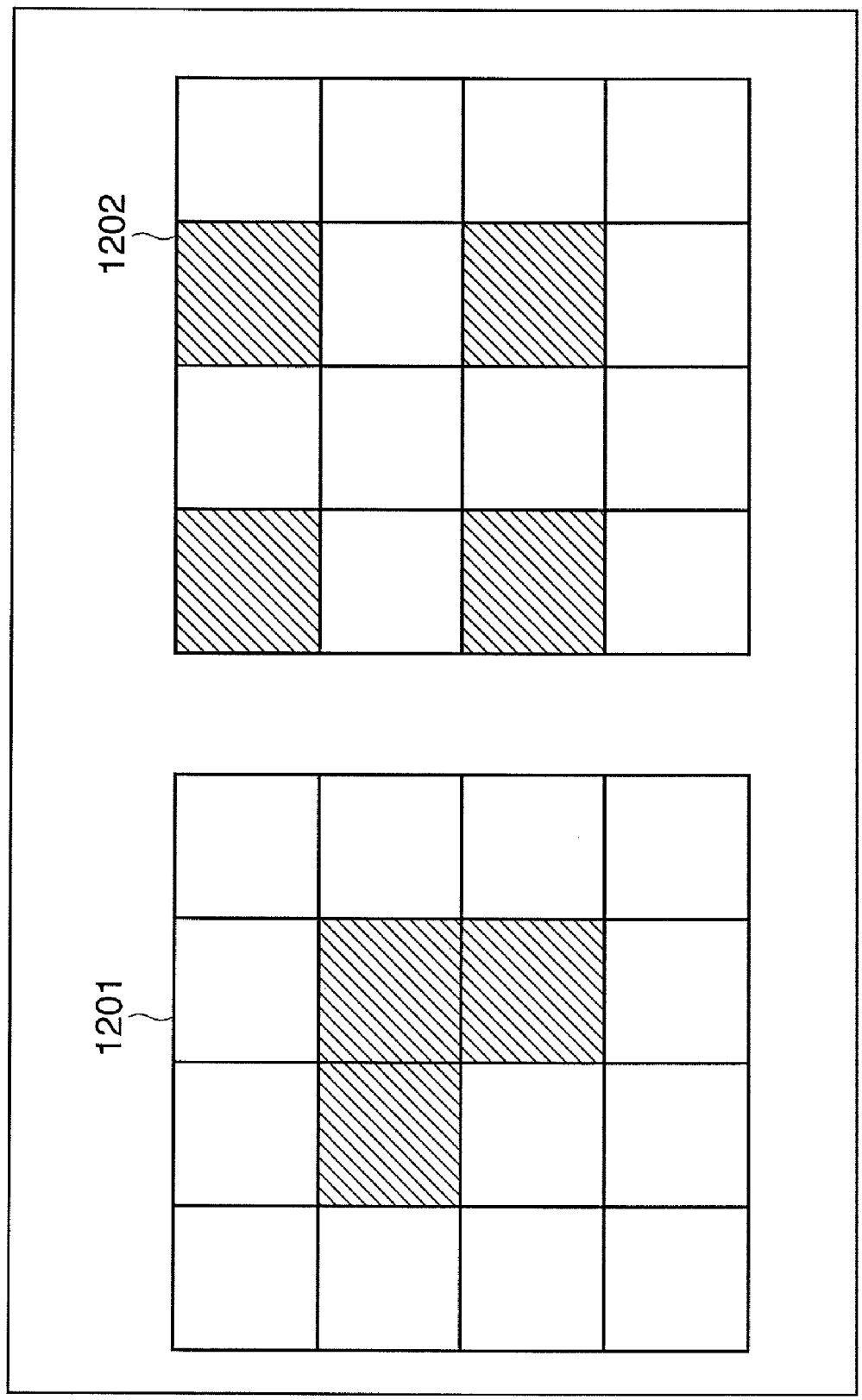
FIG. 12 is a view showing an example of a combination of latent and background patterns.
Figure 13:
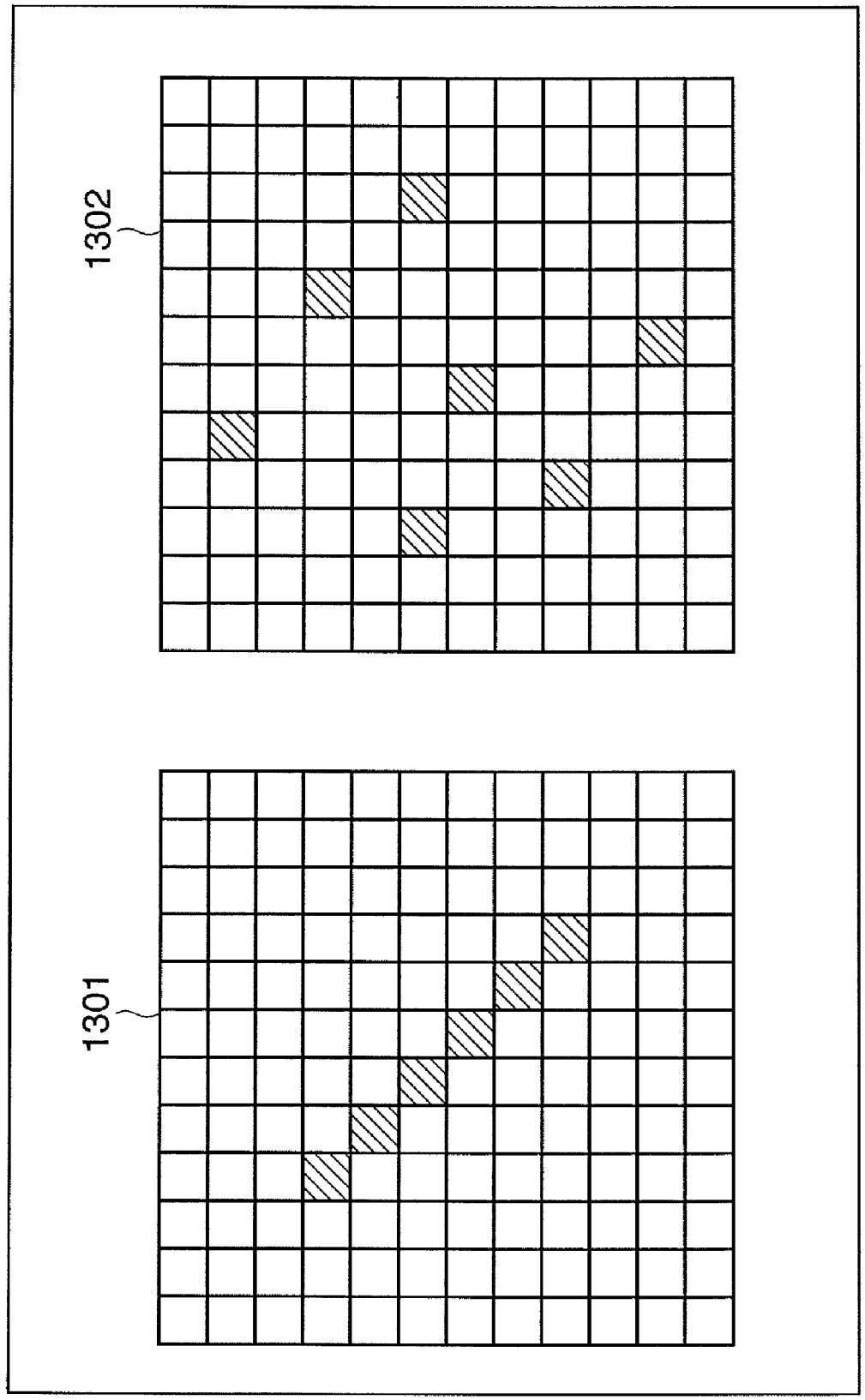
FIG. 13 is a view showing another example of a combination of latent and background patterns.

A copy-forgery-inhibited pattern (to be simply referred to as a CFIP hereinafter) contains two areas: an area (to be referred to as a latent area hereinafter) where a dot pattern remains after copying and an area (to be referred to as a background area hereinafter) where a dot pattern disappears after copying. FIGS. 12 and 13 show examples of a combination of the latent and background patterns. Reference numerals 1201 and 1301 denote examples of the latent pattern; and 1202 and 1302, examples of the background pattern corresponding to the latent patterns 1201 and 1301, respectively. These two areas macroscopically have almost the same density, and it cannot be recognized at a glance that a text or an image such as "copy" is hidden. However, these two areas microscopically have different characteristics. The hidden text or image will be called a "latent image" hereinafter.

Figure 1:
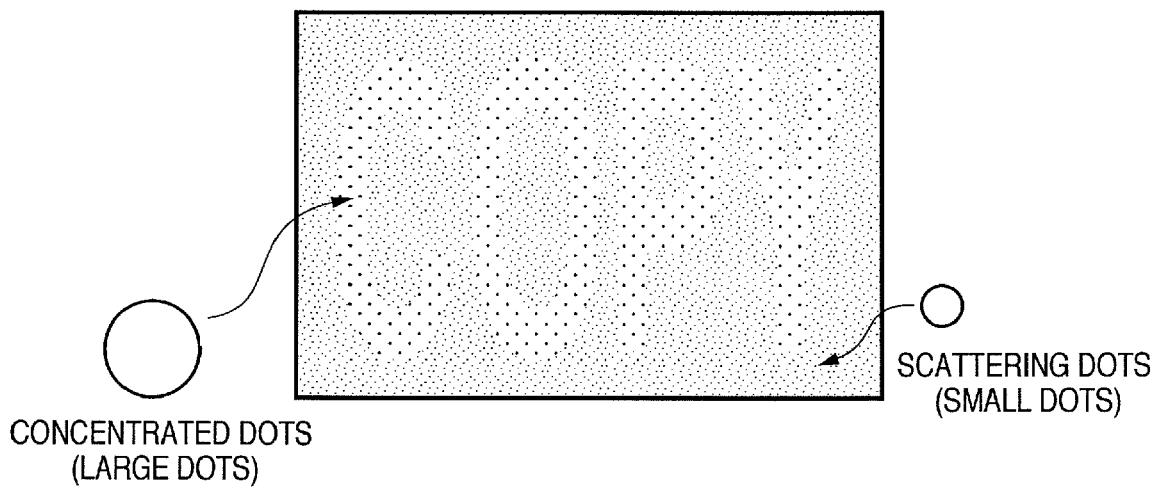
FIG. 1 is a view illustrating a document with a copy-forgery-inhibited pattern.

FIG. 1 is a view illustrating the appearance of a document with a CFIP.

For example, the latent area is formed from a dot pattern (latent pattern) of a cluster of concentrated dots. To the contrary, the background area is formed from a dot pattern (background pattern) of scattering dots. In this manner, two areas which have macroscopically almost the same density but have different characteristics can be generated. In the following description, a document having two dot patterns corresponding to the latent and background areas will be called an "original document with a CFIP".

A copying machine is generally limited in image reproducibility depending on the input resolution for reading small dots of a copy document and the output resolution of reproducing small dots. The copying machine is configured to detect, as noise, an area of a density lower than a predetermined threshold, remove the noise, and output the resultant data. For this reason, an output copy does not completely reproduce small dots, and a portion of small isolated dots is omitted.

When the background area of a CFIP is created to exceed the limit of dots reproducible by a copying machine, large dots of the CFIP can be reproduced by copying, but no small dot can be reproduced. As a result, only the latent area appears. Even if the background area does not perfectly disappear, its density is apparently different from that of the latent area, and the latent image appears.

FIG. 2 is a view illustrating the appearances of a document with a CFIP before and after copying. The upper image shows an "original document with a CFIP" before copying, and is identical to that shown in FIG. 1. The lower image shows a document output by copying, and represents a state in which the dot pattern of the background area is not reproduced and disappears. A document having only one type of dot pattern (latent pattern) corresponding to the latent area will be called a "copy document of an original document with a CFIP".

In the first embodiment, "documents" of paper documents contain not only a text but also a mixture of a text and an image such as a photograph. The printing medium is not limited to paper, and the present invention can be applied to any printing medium capable of printing a CFIP.

<Apparatus Configuration>

Figure 3:
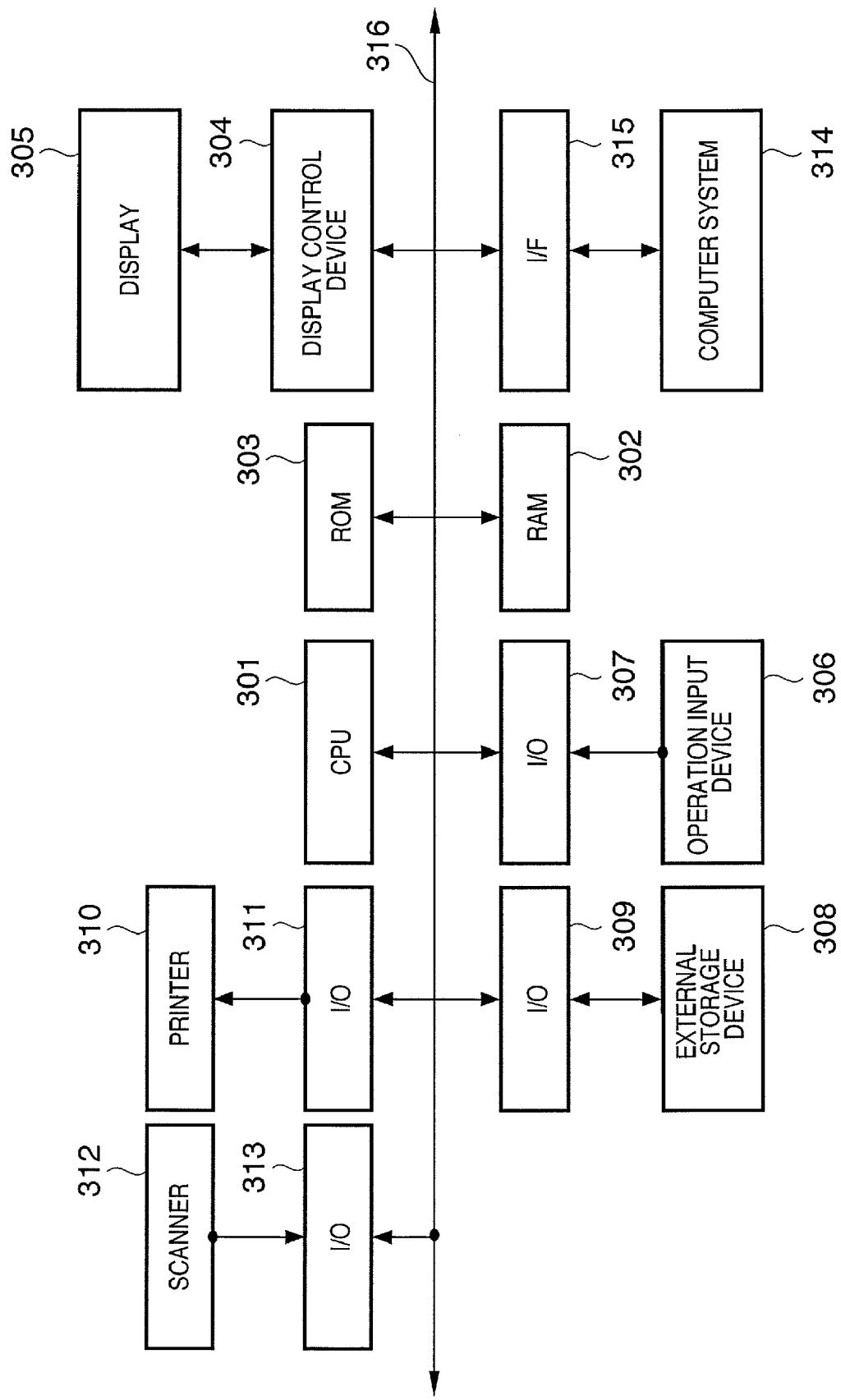
FIG. 3 is a block diagram of the internal configuration of an image processing apparatus according to the first embodiment.

FIG. 3 is a block diagram of the internal configuration of an image processing apparatus according to the first embodiment.

Reference numeral 301 denotes a CPU 301 which controls the respective units of the image processing apparatus using programs and data that are stored in an external storage device 308 and ROM 303.

Reference numeral 302 denotes a RAM which temporarily stores programs and data that are read out from the external storage device 308 or a computer system 314 via an I/F (interface) 315. The RAM 302 is also utilized as an area for allowing the CPU 301 to execute various programs.

The ROM 303 stores various control programs and setting data. Reference numeral 304 denotes a display control device which performs control processing to display an image, text, and the like on a display 305. The display 305 displays an image, text, and the like. As the display, a CRT, liquid crystal display, or the like is used.

Reference numeral 306 denotes an operation input device which accepts an instruction from the operator to the image processing apparatus. Examples of the operation input device 306 are a keyboard and mouse. Reference numeral 307 denotes an I/O for notifying the CPU 301 of various instructions and the like accepted via the operation input device 306.

The external storage device 308 functions as a large-capacity information storage device such as a hard disk, and stores an OS (Operating System) and various control programs. The external storage device 308 may store the pattern image of a background area, that of a latent area, a CFIP, an input/output document image, and the like. Write of information in the external storage device 308 and read of information from the external storage device 308 are performed via an I/O 309.

Reference numeral 310 denotes a printer which outputs a document or image and receives output data from the RAM 302 or external storage device 308 via an I/O 311. Examples of the printer for outputting a document or image are an inkjet printer, laser beam printer, thermal transfer printer, and dot impact printer.

Reference numeral 312 denotes a scanner which scans a text or image on a paper document and sends input data to the RAM 302 or external storage device 308 via an I/O 313.

Reference numeral 316 denotes a bus for connecting the CPU 301, ROM 303, RAM 302, I/O 311, I/O 309, display control device 304, I/F 315, I/O 307, and I/O 313.

<Functional Blocks in Apparatus and Operation Flow of Apparatus>

Figure 4:
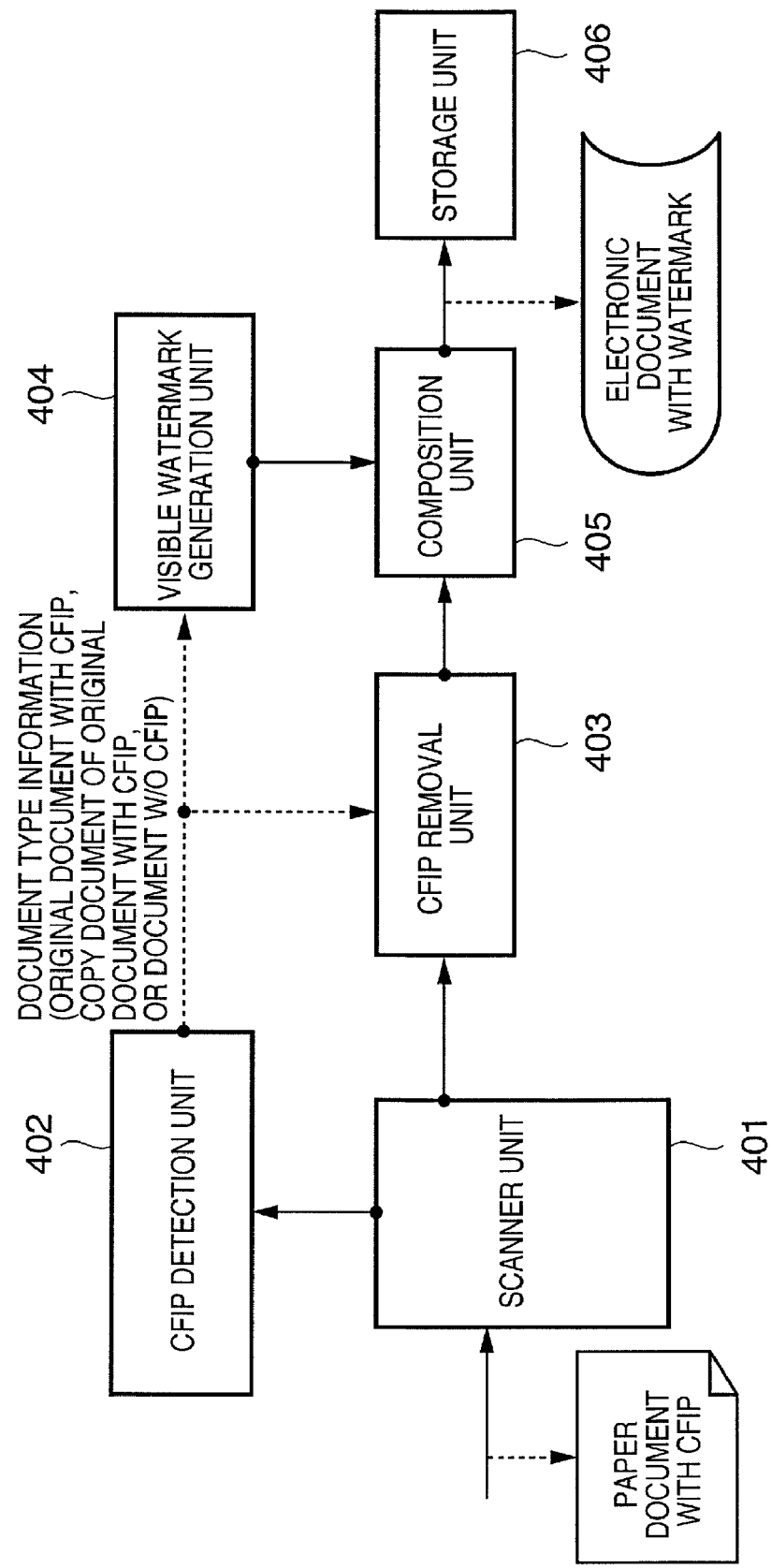
FIG. 4 is a functional block diagram of the image processing apparatus according to the first embodiment.

FIG. 4 is a functional block diagram of the image processing apparatus according to the first embodiment. The image processing apparatus is comprised of a scanner unit 401, CFIP detection unit 402, CFIP removal unit 403, visible watermark generation unit 404, composition unit 405, and storage unit 406. These units are controlled by the CPU 301. Arrows in FIG. 4 represent the flows of data between the functional blocks.

The scanner unit 401 corresponds to the scanner 312, and the storage unit 406 corresponds to the external storage device 308. On the contrary, the CFIP detection unit 402, CFIP removal unit 403, visible watermark generation unit 404, and composition unit 405 are implemented by executing programs by the CPU 301.

Figure 5:
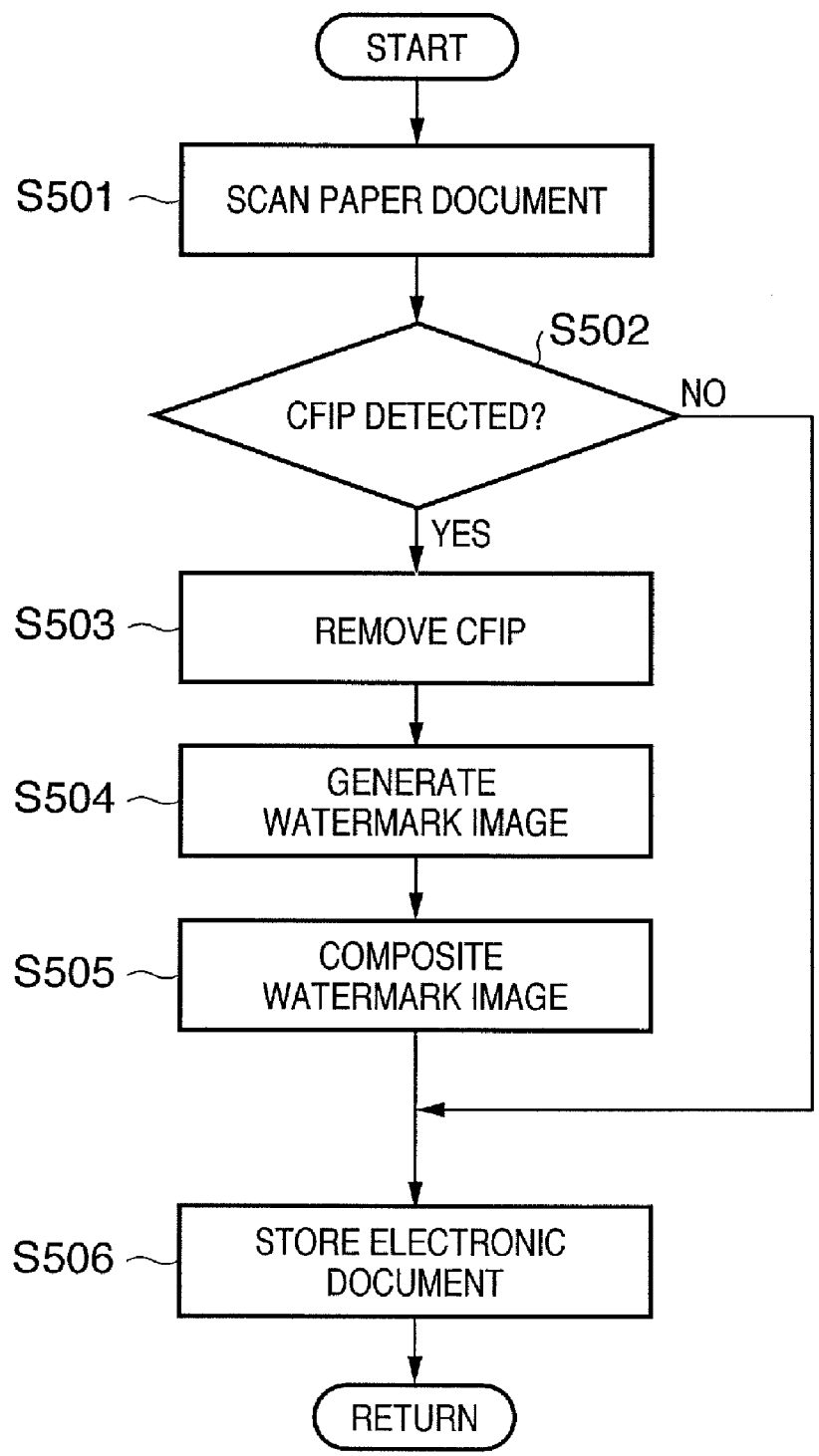
FIG. 5 is a flowchart of the image processing apparatus according to the first embodiment.

FIG. 5 is a flowchart of the operation of the image processing apparatus according to the first embodiment. Note that each step is executed by controlling each unit described above by the CPU 301. The following flow starts when, for example, the user operates the operation unit to input an instruction to scan a paper document.

In step S501, the CPU 301 controls the scanner unit 401 to scan a paper document and generate image data (first image data).

In step S502, the CFIP detection unit 402 detects whether the first image data generated in step S501 contains a portion corresponding to the latent or background area of a CFIP. In order to reduce a recognition error of a text or image other than a CFIP, it is desirable to make determination using a portion (e.g., four corners or sides of the first image data) which is less likely to contain a text or image other than a CFIP. For example, this determination can be made using a method (Japanese Patent Laid-Open No. 2004-40234) of matching a dot pattern and detecting a text and background, or a method (Japanese Patent Laid-Open No. 10-233930) of labeling black and white pixels and detecting a text and background. That is, a latent area (first pattern) is detected as a text, and a portion corresponding to a background area (second pattern) is detected as a background.

The type of the paper document scanned in step S501 is determined in accordance with the presence/absence of a portion corresponding to the latent area (first pattern) or the background area (second pattern). The determination result is stored as document type information in the RAM 302. More specifically, it is determined that the paper document is an "original document with a CFIP" when two types of patterns are detected, a "copy document of an original document with a CFIP" when one type of pattern is detected, and a "document w/o a CFIP" when no pattern is detected.

Needless to say, the configuration may be changed to accept the type of paper document manually from the user via the operation input device 306. The user may be prompted to manually select areas corresponding to the latent and background areas of a CFIP. In this case, the CFIP detection unit 402 detects only the presence/absence of a pattern in the designated area.

If the type of paper document is determined to be an "original document with a CFIP" or "copy document of an original document with a CFIP", the flow advances to step S503; if the type is determined to be a "document w/o a CFIP", to step S506.

In step S503, the CFIP removal unit 403 generates image data (second image data) by removing a portion corresponding to the latent or background area of the CFIP from the first image data generated in step S501. That is, the CFIP removal unit 403 removes, from the first image data, portions having the same patterns as the patterns (latent and background areas) detected in step S502. As the removal method, pattern matching is used to sequentially remove portions determined to match the latent and background areas. The document type information stored in the RAM 302 is loaded, and removal processing is done for the latent and background areas of an "original document with a CFIP" or for the latent area of a "copy document of an original document with a CFIP". After that, the flow advances to step S504.

In step S504, if the document type information stored in the RAM 302 represents an "original document with a CFIP", the visible watermark generation unit 404 generates a binary image of a visible watermark such as "original document" or "ORIGINAL". If the document type information stored in the RAM 302 represents a "copy document of an original document with a CFIP", the visible watermark generation unit 404 generates a binary image of a visible watermark such as "copy document" or "COPY".

In step S505, the composition unit 405 generates image data (third image data) by compositing the second image data generated in step S503 and the binary image of the visible watermark generated in step S504. Consequently, for an "original document with a CFIP", the third image data in which a text such as "ORIGINAL" is embedded as a visible watermark is generated. For a "copy document of an original document with a CFIP", the third image data in which a text such as "COPY" is embedded as a visible watermark is generated.

In step S506, the CPU 301 stores the third generated image data as an electronic document in the storage unit 406.

By the above processing, an electronic document which inherits the type (attribute) of paper document scanned by the scanner unit 401 can be generated. More specifically, an electronic document in which a text such as "ORIGINAL" is embedded as a visible watermark is generated from the paper document of an "original document with a CFIP". An electronic document in which a text such as "COPY"; is embedded as a visible watermark is generated from the paper document of a "copy document of an original document with a CFIP". An electronic document formed from a general image having no digital watermark is generated from the paper document of a "document w/o a CFIP". When an electronic document is to be generated, one of attributes "original document with a CFIP", "copy document of an original document with a CFIP", and "document w/o a CFIP" may be added as metadata to an electronic document.

By using an electronic document generated by the above-described processing, the user can easily recognize the type of electronic document. The user can confirm a visible watermark and confirm that an electronic document corresponds to an "original document with a CFIP", a "copy document of an original document with a CFIP", or a "document w/o a CFIP".

Second Embodiment

<General Description>

In the second embodiment, an electronic document with a visible watermark that is generated by the image processing apparatus of the first embodiment or the like is loaded, and the type of electronic document is determined in accordance with the image (e.g., logotype) of the visible watermark. Further, the second embodiment will describe a method of removing a portion corresponding to the visible watermark from the electronic document, and generating image data for outputting a paper document by using a CFIP technique in accordance with the type of electronic document. Note that the configuration of the apparatus is the same as that in FIG. 3 according to the first embodiment, and a description thereof will be omitted.

Note that an electronic document in which a logotype (text or image) such as "original document" or "ORIGINAL" representing that the document is an original one is embedded as a visible watermark will be called an "electronic original document". An electronic document in which a logotype such as "copy document" or "COPY" representing that the document is a copy one is embedded as a visible watermark will be called an "electronic copy document".

<Functional Blocks in Apparatus and Operation of Apparatus>

Figure 6:
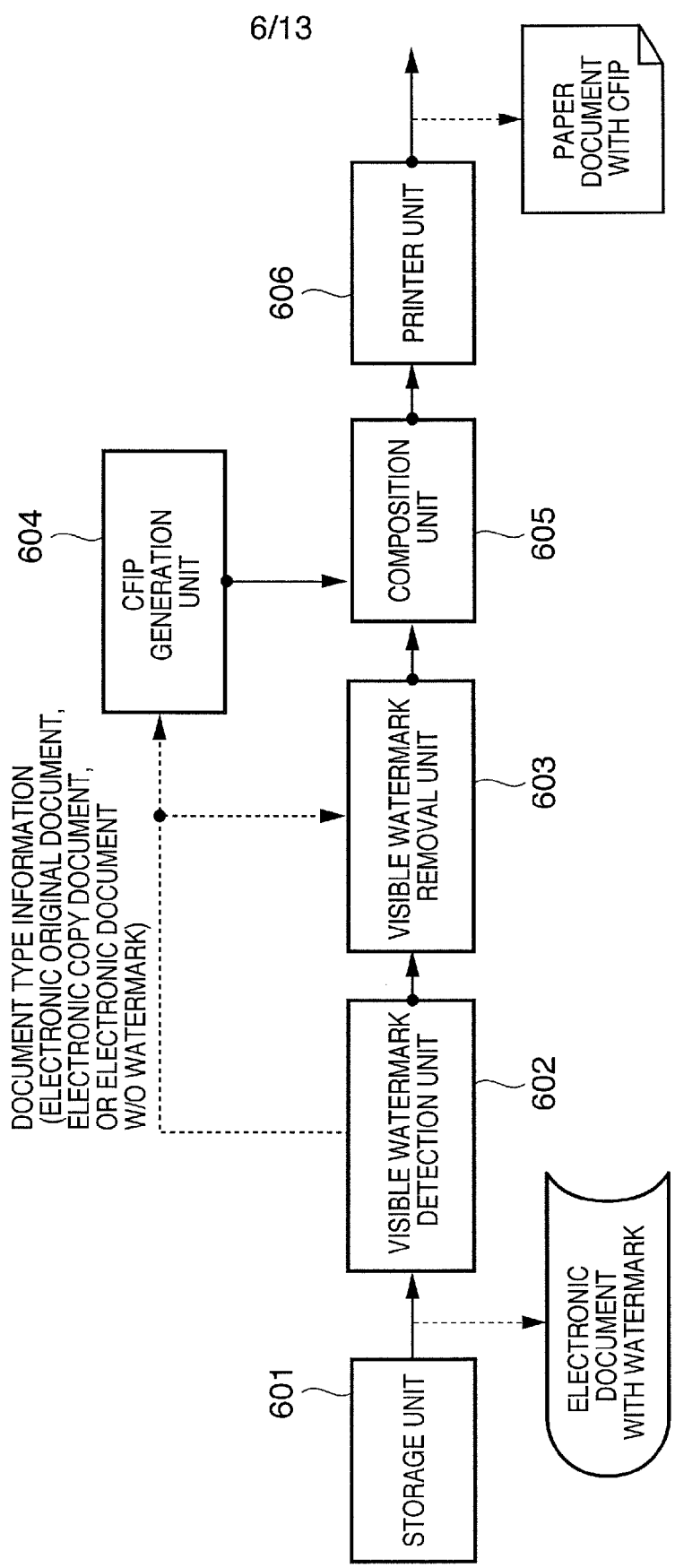
FIG. 6 is a functional block diagram of an image processing apparatus according to the second embodiment.

FIG. 6 is a functional block diagram of an image processing apparatus according to the second embodiment. The image processing apparatus is comprised of a storage unit 601, visible watermark detection unit 602, visible watermark removal unit 603, CFIP generation unit 604, composition unit 605, and printer unit 606. These units are controlled by a CPU 301. Arrows in FIG. 6 represent the flows of data between the functional blocks.

The storage unit 601 corresponds to an external storage device 308, and the printer unit 606 corresponds to a printer 310. On the other hand, the visible watermark detection unit 602, visible watermark removal unit 603, CFIP generation unit 604, and composition unit 605 are implemented by executing programs by the CPU 301.

Figure 7:
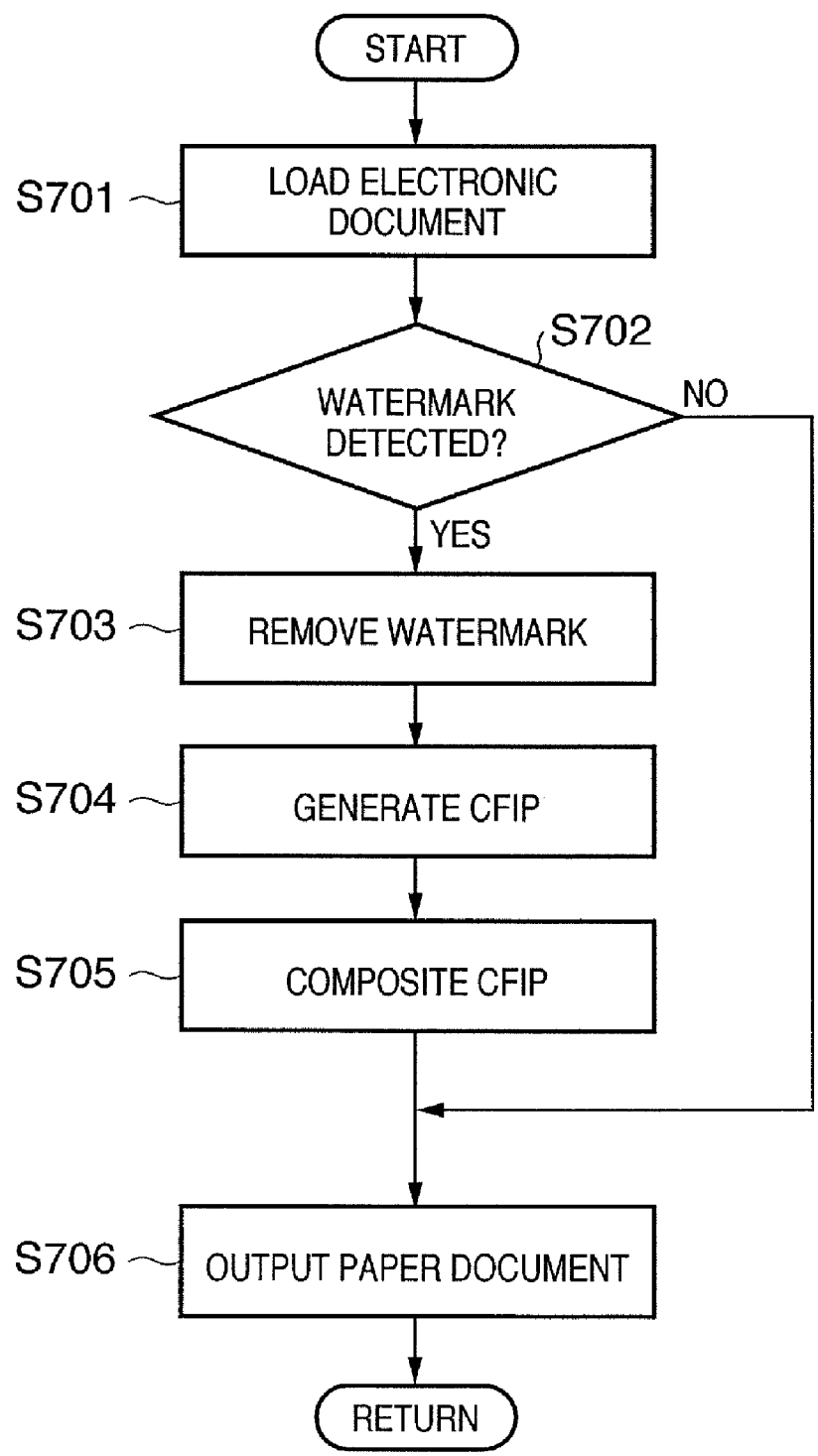
FIG. 7 is a flowchart of the image processing apparatus according to the second embodiment.

FIG. 7 is a flowchart of the operation of the image processing apparatus according to the second embodiment. Note that each step is executed by controlling each unit described above by the CPU 301. The following flow starts when, for example, the user operates the operation unit to input an instruction to output image data with a digital watermark on a printing medium such as paper.

In step S701, the CPU 301 loads an electronic document (first image data) from the storage unit 601.

In step S702, the visible watermark detection unit 602 detects whether the image data loaded in step S701 contains a portion corresponding to a visible watermark. As the detection technique, the above-described method (Japanese Patent Laid-Open No. 10-233930) of labeling black and white pixels and detecting latent and background areas can be applied. In order to reduce a recognition error, it is desirable to make determination using a portion (e.g., four corners or sides of image data) which is less likely to contain a text or image other than a CFIP.

Using an existing character recognition technique or the like, a text (or image) such as "original document", "ORIGINAL", "copy document", or "COPY" is detected from a portion embedded as a visible watermark. The type of the electronic document loaded in step S701 is determined from the detected character string, and the determination result is stored as document type information in a RAM 302. More specifically, it is determined that the electronic document is an "electronic original document" when a text such as "original document" or "ORIGINAL" is detected, and a "copy document of an original document with a CFIP" when a text such as "copy document" or "COPY" is detected. When no visible watermark is detected, it is determined that the electronic document is a "document w/o a CFIP". When one of type attributes "electronic original document", "copy document of an original document with a CFIP", and "document w/o a CFIP" is added as metadata to an electronic document, the type can be easily determined from the metadata.

In addition to the above-mentioned automatic recognition, the configuration may be changed to accept the type of electronic document manually from the user via an operation input device 306.

If the type of electronic document is determined to be an "electronic original document" or "electronic copy document", the flow advances to step S703; if the type is determined to be an "electronic document w/o a watermark", to step S706.

In step S703, the visible watermark removal unit 603 generates image data (second image data) by removing a portion corresponding to the visible watermark from the electronic document loaded in step S701. That is, the visible watermark removal unit 603 removes, from the image data, a portion having the same pattern as the text (or image) detected in step S702. As the removal method, pattern matching is used to sequentially remove portions determined to match the detected text (or image). After the removal processing is performed, the flow advances to step S704. Note that the user may be prompted to manually select a portion corresponding to the visible watermark.

In step S704, if the document type information stored in the RAM 302 represents an "electronic original document", the CFIP generation unit 604 forms an image (CFIP) from latent and background patterns. Note that patterns used for the latent and background patterns can be arbitrary ones available for a CFIP. If the document type information stored in the RAM 302 represents an "electronic copy document", the CFIP generation unit 604 forms an image from only a latent area (first pattern).

In step S705, the composition unit 605 generates image data (third image data) by compositing the image data generated in step S703 and the image generated in step S704. Resultantly, for an "electronic original document", image data containing a CFIP made up of latent and background areas is generated. For an "electronic copy document", image data containing an image formed from only a latent area is generated.

In step S706, the CPU 301 controls the printer unit 606 to output the generated image data onto a printing medium (paper).

By the above processing, a paper document which inherits the type (attribute) of electronic document read from the storage unit 601 can be output. More specifically, a paper document containing a CFIP made up of latent and background areas is output for an "electronic original document". A paper document containing an image formed from only a latent area is output for an "electronic copy document". Moreover, a paper document formed from only a general image having no special image is output for an electronic document "w/o a watermark".

By using a paper document generated by the above-described processing, the user can easily recognize the type of paper document. The user can confirm a CFIP and confirm that a paper document corresponds to an "electronic original document", an "electronic copy document", or an electronic document "w/o a watermark".

With a combination of the image processing apparatuses in the second and first embodiments, the paper document of an original document with a CFIP and that of a copy document of an original document with a CFIP can be distinctively output even when a generated electronic document is output again as a paper document.

Third Embodiment

<General Description>

The third embodiment will describe a case wherein an electronic document having a CFIP is generated. The third embodiment is mainly different from the first embodiment in that a CFIP is added by determining the presence/absence of the latent and background areas of a CFIP in accordance with the document type. Note that the configuration of the apparatus is the same as that in FIG. 3 according to the first embodiment, and a description thereof will be omitted.

<Functional Blocks in Apparatus and Operation Flow of Apparatus>

Figure 8:
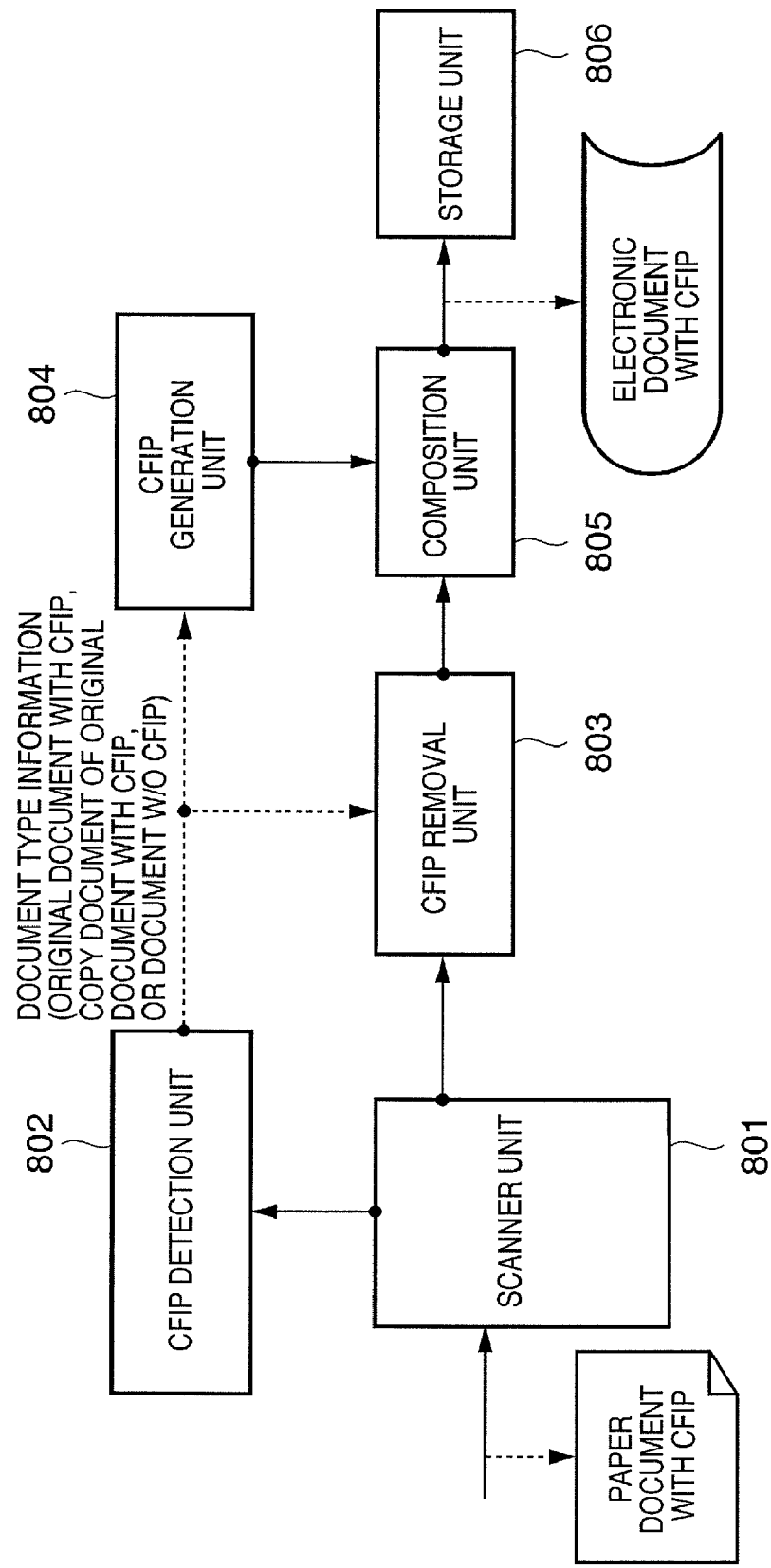
FIG. 8 is a functional block diagram of an image processing apparatus according to the third embodiment.

FIG. 8 is a functional block diagram of an image processing apparatus according to the third embodiment. The functional blocks are the same as those shown in FIG. 4 except that the image processing apparatus has a CFIP generation unit 804 instead of the visible watermark generation unit 404, and thus a detailed description thereof will be omitted.

Figure 9:
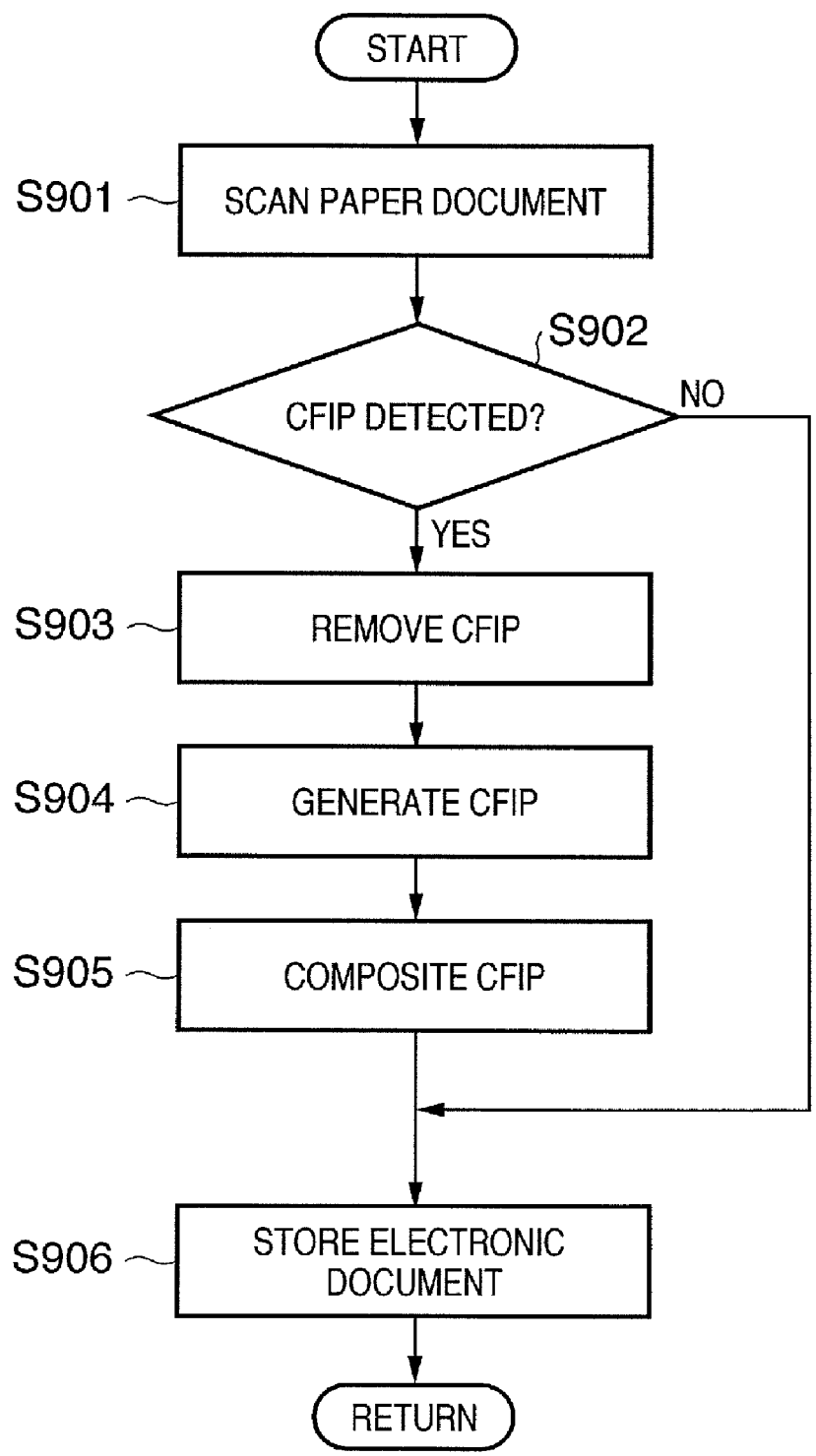
FIG. 9 is a flowchart of the image processing apparatus according to the third embodiment.

FIG. 9 is a flowchart of the operation of the image processing apparatus according to the third embodiment. Note that each step is executed by controlling each unit described above by a CPU 301.

In step S901, the CPU 301 controls a scanner unit 801 to scan a paper document and generate image data (first image data).

In step S902, a CFIP detection unit 802 detects whether the first image data generated in step S901 contains a portion corresponding to the latent or background area of a CFIP. This step is the same as step S502 described above, and a detailed description thereof will be omitted.

In step S903, a CFIP removal unit 803 generates image data (second image data) by removing a portion corresponding to the latent or background area of the CFIP from the first image data generated in step S901. This step is the same as step S503 described above, and a detailed description thereof will be omitted.

In step S904, if document type information stored in a RAM 302 represents an "original document with a CFIP", the CFIP generation unit 804 forms an image (CFIP) from a latent area (first pattern) and background area (second pattern). Note that patterns used for the latent and background areas can be arbitrary ones available for a CFIP. If the document type information stored in the RAM 302 represents a "copy document of an original document with a CFIP", the CFIP generation unit 804 forms an image from only a latent area (first pattern).

In step S905, a composition unit 805 generates image data (third image data) by compositing the second image data generated in step S903 and the image generated in step S904. Accordingly, for an "original document with a CFIP", the third image data containing a CFIP made up of latent and background areas is generated. For a "copy document of an original document with a CFIP", the third image data containing an image formed from only a latent area is generated.

In step S906, the CPU 301 stores the third generated image data as an electronic document in a storage unit 806.

By the above processing, an electronic document which inherits the type (attribute) of paper document scanned by the scanner unit 801 can be generated. More specifically, an electronic document containing a CFIP made up of latent and background areas is generated from the paper document of an "original document with a CFIP". An electronic document containing an image formed from only a latent area is generated from the paper document of a "copy document of an original document with a CFIP". An electronic document formed from a general image having no special additional image is generated from a paper document "w/o a CFIP".

By using an electronic document generated by the above-described processing, a paper document which inherits the type (attribute) of electronic document can be generated without performing the processing flow described in the second embodiment. The third embodiment has another advantage of generating a certificate with a CFIP without using any security paper with a CFIP.

Fourth Embodiment

<General Description>

The fourth embodiment will describe a configuration capable of permitting a person who has an original document with a CFIP to make a copy, inhibiting a person who has a copy document of an original document with a CFIP from making a copy, and permitting a person who has a general document w/o a CFIP to make a copy.

In the fourth embodiment, when both latent and background patterns are detected from scanned document image data, it is determined that the document is an original document and that a person who is to copy the document is one who created the original document and is reliable, and thus the person is permitted to copy the document. Then, a copy is generated as a copy document of an original document with a CFIP. When the scanned document image data has only a latent pattern, it is determined that the document is a copy document of an original document and that a person who is to copy the document is not one who created the original document and is not reliable. In this case, copying is inhibited for fear that many copies are created from a copy document of an original document and many created copies of the copy document are distributed. When neither a latent pattern nor a background pattern is detected, it is determined that the document is an unimportant one, and a person is permitted to copy the document.

Note that the configuration of the apparatus is the same as that in FIG. 3 according to the first embodiment, and a description thereof will be omitted.

<Functional Blocks in Apparatus and Operation Flow of Apparatus>

Figure 10:
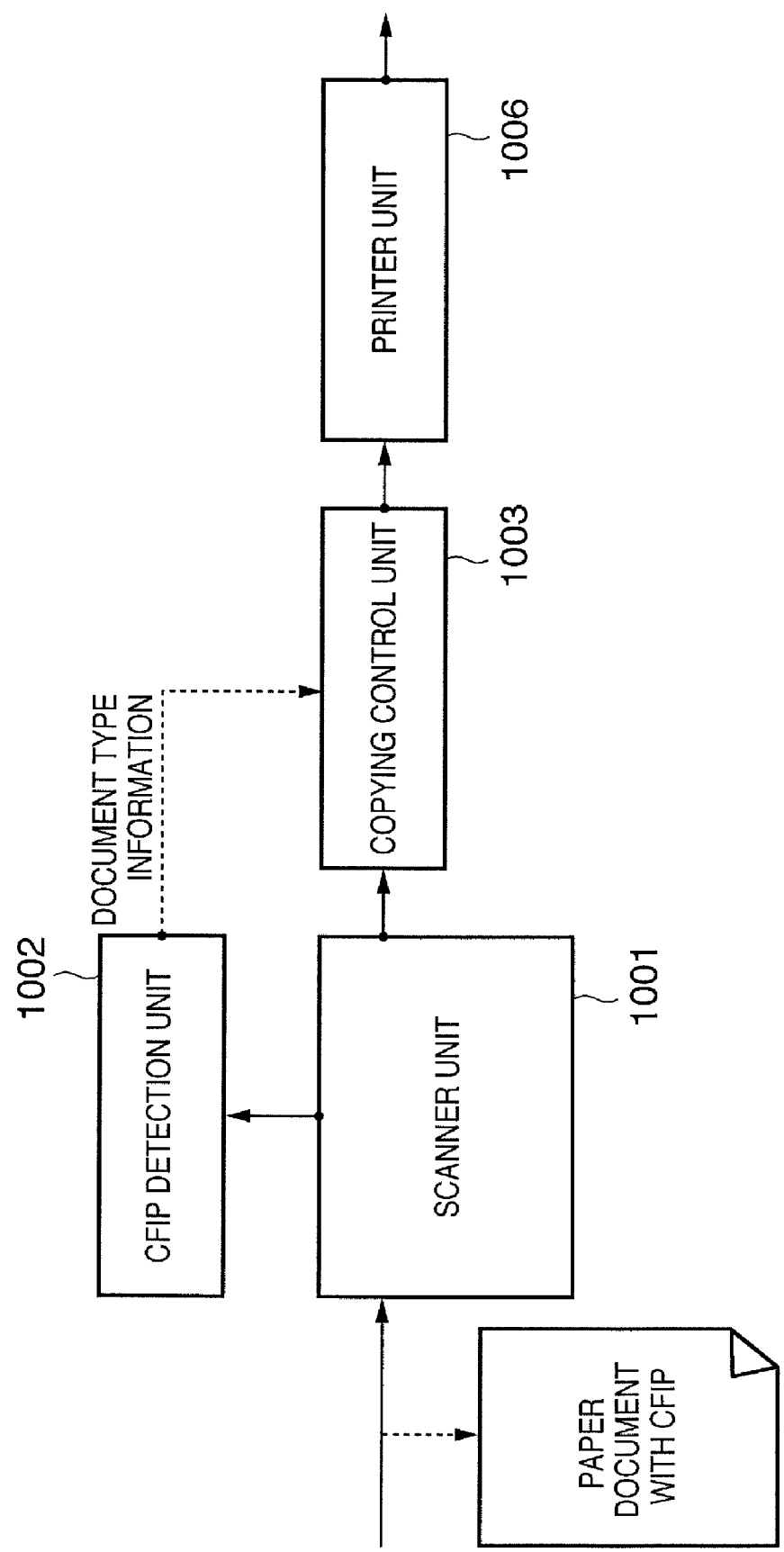
FIG. 10 is a functional block diagram of an image processing apparatus according to the fourth embodiment.

FIG. 10 is a functional block diagram of an image processing apparatus according to the fourth embodiment. The image processing apparatus is comprised of a scanner unit 1001, CFIP detection unit 1002, copying control unit 1003, and printer unit 1006. These units are controlled by a CPU 301. Arrows in FIG. 10 represent the flows of data between the functional blocks.

The scanner unit 1001 corresponds to a scanner 312, and the printer unit 1006 corresponds to a printer 310. On the contrary, the CFIP detection unit 1002 and copying control unit 1003 are implemented by executing programs by the CPU 301.

Figure 11:
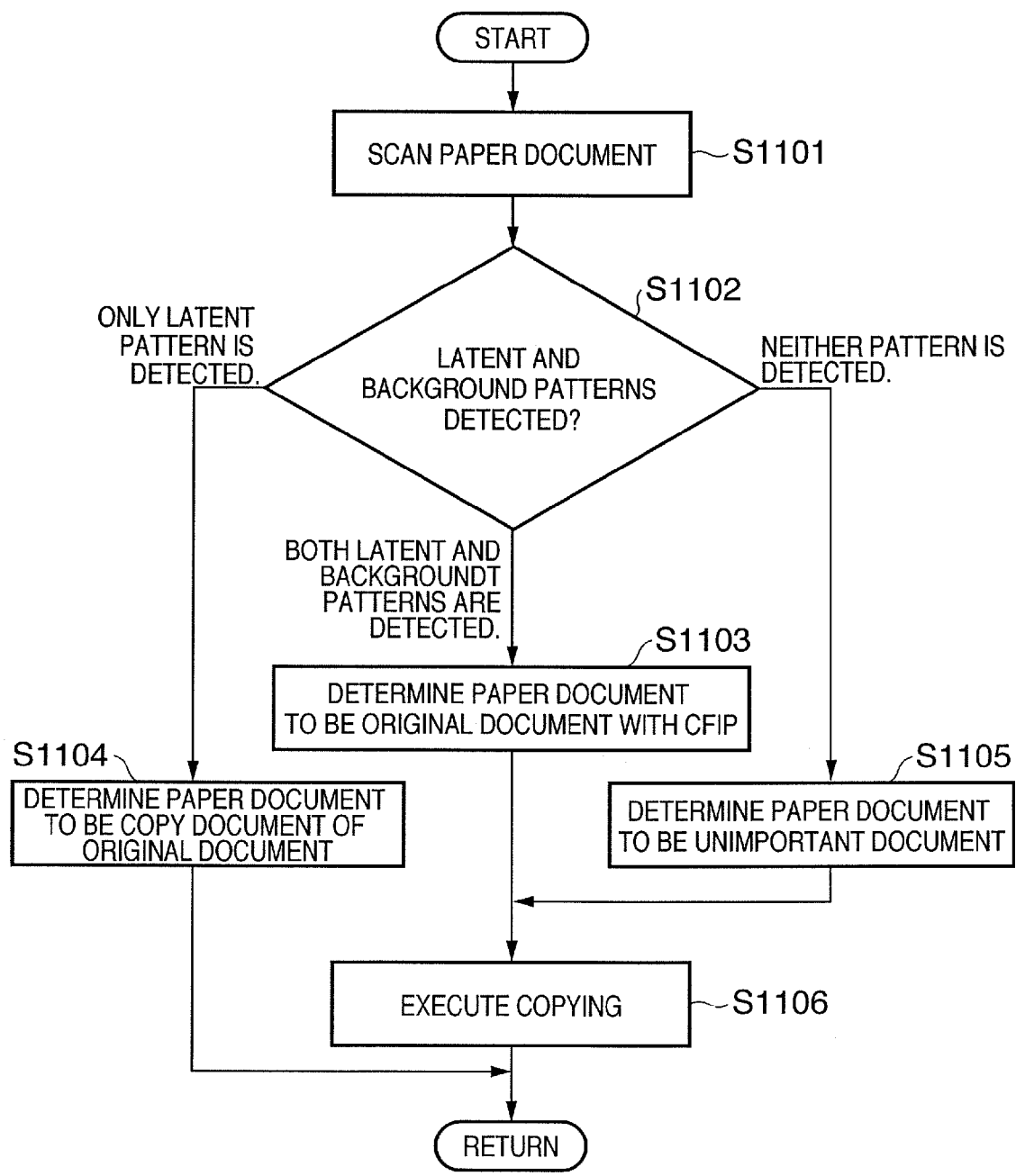
FIG. 11 is a flowchart of the image processing apparatus according to the fourth embodiment.

FIG. 11 is a flowchart of the operation of the image processing apparatus according to the fourth embodiment. Note that each step is executed by controlling each unit described above by the CPU 301. The following flow starts when, for example, the user operates the operation unit to input an instruction to copy a paper document.

In step S1101, the CPU 301 controls the scanner unit 1001 to scan a paper document and generate document image data.

In step S1102, the CFIP detection unit 1002 detects whether the document image data generated in step S1101 contains both latent and background patterns.

The type of the paper document scanned in step S1101 is determined on the basis of whether a portion corresponding to the latent or background pattern is detected. The determination result is stored as document type information in a RAM 302. It is determined that the paper document is an "original document with a CFIP" when the two patterns are detected, a "copy document of an original document with a CFIP" when only the latent pattern is detected, and a "document w/o a CFIP" when no pattern is detected.

If the paper document is determined to be an "original document with a CFIP", the flow advances to step S1103; if it is determined to be a "copy document of an original document with a CFIP", to step S1104; if it is determined to be a "document w/o a CFIP", to step S1105.

In step S1103, the copying control unit 1003 determines that the paper document scanned in step S1101 is an original document and that a person who is to copy the paper document is one who created the original document and is reliable. Thus, the copying control unit 1003 determines that copying is permitted. Then, the flow advances to step S1106.

In step S1104, the copying control unit 1003 determines that the paper document scanned in step S1101 is a copy document of an original document and that a person who is to copy the paper document is not one who created the original document, i.e., the person is not reliable. In this case, the copying control unit 1003 determines that copying is inhibited for fear that many copies are created from the copy document of the original document and many created copies of the copy document are distributed. Then, the flow ends.

In step S1105, the copying control unit 1003 determines that the paper document scanned in step S1101 is an unimportant document and that copying is permitted. Then, the flow advances to step S1106.

In step S1106, the printer unit 1006 prints out the document image data generated in step S1101 onto a printing medium such as paper. If the document scanned in step S1101 is an "original document with a CFIP", its copy is output as a "copy document of an original document with a CFIP".

As described above, copying is controlled to achieve control of permitting copying of an original document but inhibiting copying of a copy document of an original document. That is, this control can suppress leakage of a confidential document from a person who has a copy document of an original document ("copy document of an original document with a CFIP").

Other Embodiment

The embodiments of the present invention have been described in detail above. The present invention can be applied to a system constituted by a plurality of devices, or to an apparatus comprising a single device.

The present invention is also achieved even by supplying a program which implements the functions of the above-described embodiments to the system or apparatus directly or from a remote site and causing the system or apparatus to read out and execute the supplied program code. Hence, to implement the functional processing of the present invention by a computer, the program code itself, which is installed in the computer, also falls within the technical scope of the present invention.

In this case, the present invention can take any program form such as an object code, a program executed by an interpreter, or script data supplied to an OS as long as a program function is attained.

To supply the program, the program may be stored in a recording medium. Examples of the recording medium are a floppy® disk, hard disk, optical disk, magnetooptical disk, MO, CD-ROM, magnetic tape, nonvolatile memory card, ROM, and DVD-ROM.

As another program supply method, the program can also be supplied by downloading the computer program of the present invention from the Web page on the Internet using the browser of a client computer. The program can also be supplied by downloading a compressed file containing an automatic installing function to a recording medium such as a hard disk. The program can also be implemented by grouping program codes which form the program of the present invention into a plurality of files, and downloading the files from different Web pages. That is, a WWW server which allows a plurality of users to download the program files for implementing functional processing of the present invention by a computer also falls within claims of the present invention.

The program of the present invention may also be encrypted, stored in a storage medium such as a CD-ROM, and distributed to the user. A user who satisfies predetermined conditions is prompted to download decryption key information from a Web page via the Internet. The user executes the encrypted program using the key information, and installs the program in the computer.

The functions of the above-described embodiments may be implemented when the computer executes the readout program. The functions of the above-described embodiments can also be implemented when an OS or the like running on the computer performs part or all of actual processing on the basis of the instructions of the program.

Furthermore, the program read out from the recoding medium is written in the memory of a function expansion board inserted into the computer or the memory of a function expansion unit connected to the computer. Then, the CPU of the function expansion board or function expansion unit performs part or all of actual processing on the basis of the instructions of the program, thereby implementing the functions of the above-described embodiments.

As many apparently widely different embodiments of the present invention can be made without departing from the spirit and scope thereof, it is to be understood that the invention is not limited to the specific embodiments thereof except as defined in the claims.

This application claims the benefit of Japanese Applications No. 2005-221460, filed Jul. 29, 2005 and No. 2006-182187, filed Jun. 30, 2006, which are hereby incorporated by reference herein in their entirety.

What is claimed is:

1. An image processing apparatus comprising:
   a scanning unit which scans an image printed on paper;
   a first determination unit which determines whether a latent pattern exists in the scanned image;
   a second determination unit which determines whether a background pattern exists in the scanned image; and
   a control unit which, in the case that said first determination unit determines that the latent pattern exists in the scanned image and said second determination unit determines that the background pattern exists in the scanned image, determines that the scanning by the scanning unit was instructed by a reliable user and controls to copy the scanned image, and in the case that said first determination unit determines that the latent pattern exists in the scanned image and said second determination unit determines that no background pattern exists in the scanned image, determines that the scanning by the scanning unit was not instructed by a reliable user and controls to inhibit copying of the scanned image, wherein each of said first and second determination unit determines by using a periphery region of the scanned image data in order to reduce a determination error due to text or an image other than a copy-forgery-inhibited-pattern.

2. The apparatus according to claim 1, wherein a reflection density of the latent pattern and a reflection density of the background pattern are substantially identical on a sheet on which the latent pattern and the background pattern are formed, and the reflection density of the latent pattern is higher than the reflection density of the background pattern on a sheet obtained by copying of the sheet.

3. An image processing apparatus control method comprising:
   scanning an image printed on paper;
   a first determination step of determining whether a latent pattern exists in the scanned image;
   a second determination step of determining whether a background pattern exists in the scanned image; and
   a control step of in the case that the latent pattern is determined in the first determination step to exist in the scanned image and the background pattern is determined in the second determination step to exist in the scanned image, determining that the scanning by the scanning unit was instructed by a reliable user and controlling to copy the scanned image, and in the case that the latent pattern is determined in the first determination step to exist in the scanned image and the background pattern is determined in the second determination step not to exist in the scanned image, determining that the scanning by the scanning unit was not instructed by a reliable user and controlling to inhibit copying of the scanned image,
   wherein each of said first and second determination steps determines by using a periphery region of the scanned image data in order to reduce a determination error due to text or an image other than a copy-forgery-inhibited-pattern.

4. The method according to claim 3, wherein a reflection density of the latent pattern and a reflection density of the background pattern are substantially identical on a sheet on which the latent pattern and the background pattern are formed, and the reflection density of the latent pattern is higher than the reflection density of the background pattern on a sheet obtained by copying of the sheet.

5. A computer-readable storage medium storing a program for causing a computer to implement an image processing apparatus control method defined in claim 3.

\* \* \* \* \*